(12) United States Patent  
Oka

(10) Patent No.: US 11,902,478 B2  
(45) Date of Patent: Feb. 13, 2024

(54) SYSTEM, USER DEVICE AND METHOD THAT ENABLES THE USER TO BE EFFECTIVELY NOTIFIED OF A FAILURE CIRCUMSTANCE

(71) Applicant: TOSHIBA TEC KABUSHIKI KAISHA, Tokyo (JP)

(72) Inventor: Yuya Oka, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/119,098

(22) Filed: Mar. 8, 2023

(65) Prior Publication Data

US 2023/0224414 A1 Jul. 13, 2023

Related U.S. Application Data

(63) Continuation of application No. 17/344,429, filed on Jun. 10, 2021, now Pat. No. 11,627,228.

(30) Foreign Application Priority Data

Nov. 11, 2020 (JP) .................................. 2020-187817

(51) Int. Cl.  
*H04N 1/00* (2006.01)  
*G06F 16/23* (2019.01)

(52) U.S. Cl.  
CPC ..... *H04N 1/00244* (2013.01); *G06F 16/2379* (2019.01); *H04N 1/00037* (2013.01);  
(Continued)

(58) Field of Classification Search  
CPC .......... H04N 1/00244; H04N 1/00037; H04N 1/00079; H04N 1/00344; H04N 2201/0094; G06F 16/2379; G06F 11/327  
(Continued)

(56) References Cited

U.S. PATENT DOCUMENTS 10,764,449 B2 * 9/2020 Matsui ............... H04N 1/00307  
2018/0032020 A1 * 2/2018 Shintani ................. G03G 15/70  
(Continued)

FOREIGN PATENT DOCUMENTS

JP 2013-105314 A 5/2013  
JP 2014-178803 A 9/2014  
(Continued)

OTHER PUBLICATIONS

Notice of Allowance on U.S. Appl. No. 17/344,429 dated Dec. 8, 2022.

*Primary Examiner* — Neil R McLean  
(74) *Attorney, Agent, or Firm* — FOLEY & LARDNER LLP

(57) ABSTRACT

A server device includes communication means, information storage means, and output means. The communication means communicates with an information processing device that includes a display unit for displaying a symbol and a sending unit for sending information relating to the failure of the own device. The information storage means stores the information relating to the failure sent from the information process device. The output means outputs information relating to the failure stored in an access destination specified by the symbol to a user terminal that reads the symbol.

20 Claims, 11 Drawing Sheets

(52) U.S. Cl.
CPC ..... *H04N 1/00079* (2013.01); *H04N 1/00344*
(2013.01); *H04N 2201/0094* (2013.01)

(58) Field of Classification Search
USPC ........................................................ 358/1.14
See application file for complete search history.

(56) References Cited

U.S. PATENT DOCUMENTS

| | | | |
|---|---|---|---|
| 2018/0176394 A1* | 6/2018 | Han | H04N 1/00079 |
| 2019/0373117 A1 | 12/2019 | Matsui | |

FOREIGN PATENT DOCUMENTS

| | | |
|---|---|---|
| JP | 2018-001458 A | 1/2018 |
| JP | 2018-186573 A | 11/2018 |

* cited by examiner

FIG. 4

| DEVICE ID | IMAGE DATA | URL |
|---|---|---|
|  |  |  |
|  |  |  |
|  |  |  |
| ⋮ | ⋮ | ⋮ |

| DEVICE ID | FAILURE DATE | UPDATE DATE | FAILURE CONTENT | URL | RECOVERY FLAG |
|---|---|---|---|---|---|
| 001 | JULY 20TH | JULY 22ND | SCANNER FAILURE | http://wx.yz/ | 0/1 |
|  |  |  |  |  |  |
|  |  |  |  |  |  |
| ⋮ | ⋮ | ⋮ | ⋮ | ⋮ | ⋮ |

233

SYSTEM, USER DEVICE AND METHOD THAT ENABLES THE USER TO BE EFFECTIVELY NOTIFIED OF A FAILURE CIRCUMSTANCE

CROSS-REFERENCE TO RELATED APPLICATIONS

This application is a continuation of U.S. patent application Ser. No. 17/344,429, filed on Jun. 10, 2021, which is based upon and claims the benefit of priority from Japanese Patent Application No. 2020-187817, filed on Nov. 11, 2020, the entire contents of each of which are incorporated herein by reference.

FIELD

Embodiments described herein relate to a server device and a control method thereof.

BACKGROUND

An information processing device such as a digital multifunctional peripheral (MFP) in the related art has the function of notifying a user of a failure circumstance if a failure occurs. In order to use this function, the user needs to register a contact destination, such as an e-mail address in the information processing device, in advance. That is, if the user does not register the contact destination, the user is not notified of the failure circumstance. When the user registers the contact destination, the user is notified of each failure circumstance. Therefore, among the users who register the contact destination but do not frequently use the information processing device, some users feel annoyed by being notified of each failure circumstance. Therefore, there is a demand for a mechanism that allows the user to be efficiently notified of the failure circumstance.

DESCRIPTION OF THE DRAWINGS

FIG. 4 is a schematic diagram illustrating an example of an image table;

FIG. 5 is a schematic diagram illustrating an example of a management table;

DETAILED DESCRIPTION

The present disclosure is related to providing a server device that enables the user to be effectively notified of the failure circumstance, and a control method thereof.

In general, according to one embodiment, a server device includes communication means, information storage means, and output means. The communication means communicates with an information processing device that includes a display unit for displaying a symbol and a sending unit for sending information relating to the failure of the information processing device. The information storage means stores the information relating to the failure sent from the information processing device. The output means outputs information relating to the failure stored in an access destination specified by the symbol to a user terminal that reads the symbol.

Hereinafter, one embodiment is described with reference to the drawings.

Figure 1:
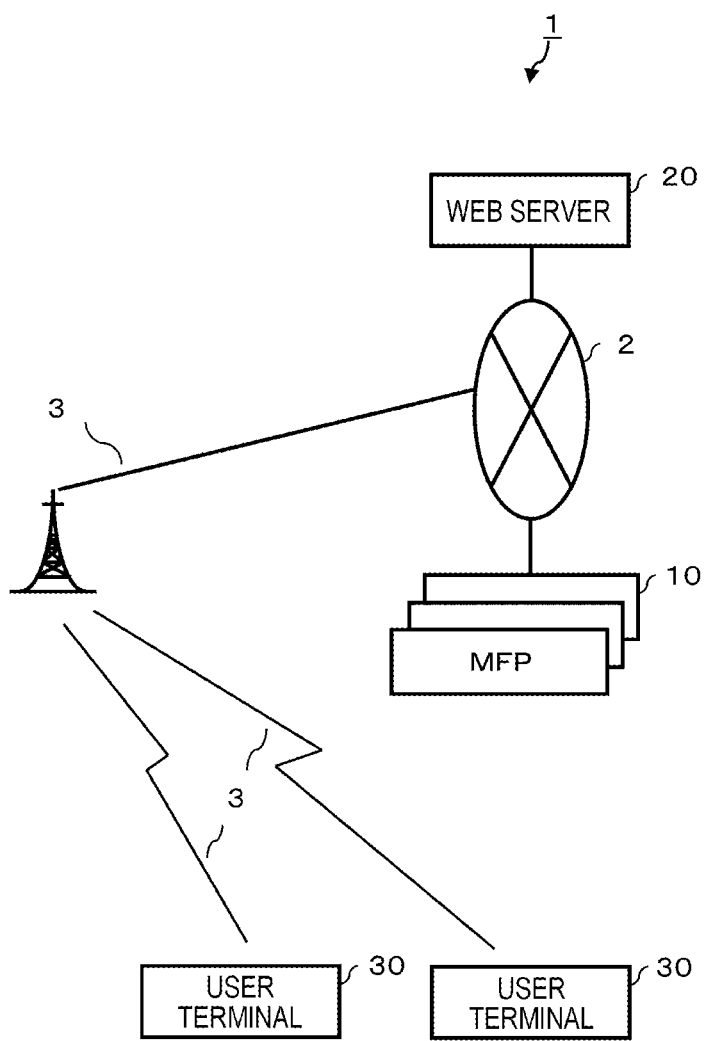
FIG. 1 is a schematic diagram schematically illustrating an information processing system according to an embodiment.

FIG. 1 is a schematic diagram schematically illustrating an information processing system 1 according to an embodiment. The information processing system 1 includes a plurality of MFPs 10 (information processing devices, target devices) and a Web server 20 (server). The MFP 10 is an example of an information processing device. The Web server 20 is a server device (server) for managing the MFPs 10. The MFP 10 and the Web server 20 are connected to each other to a dedicated communication network 2. The dedicated communication network 2 is typically a dedicated digital line, an Integrated Services Digital Network (ISDN) line, or the like. In addition, the Web server 20 provides a service from the dedicated communication network 2 to a plurality of user terminals 30 via a wide area network 3, such as the Internet. The user terminal 30 is a terminal possessed by a user who uses the MFP 10. The user terminal 30 is a well-known portable terminal compatible with the Internet. For example, a smartphone, a tablet terminal, and the like can be used as the user terminal 30.

Figure 2:
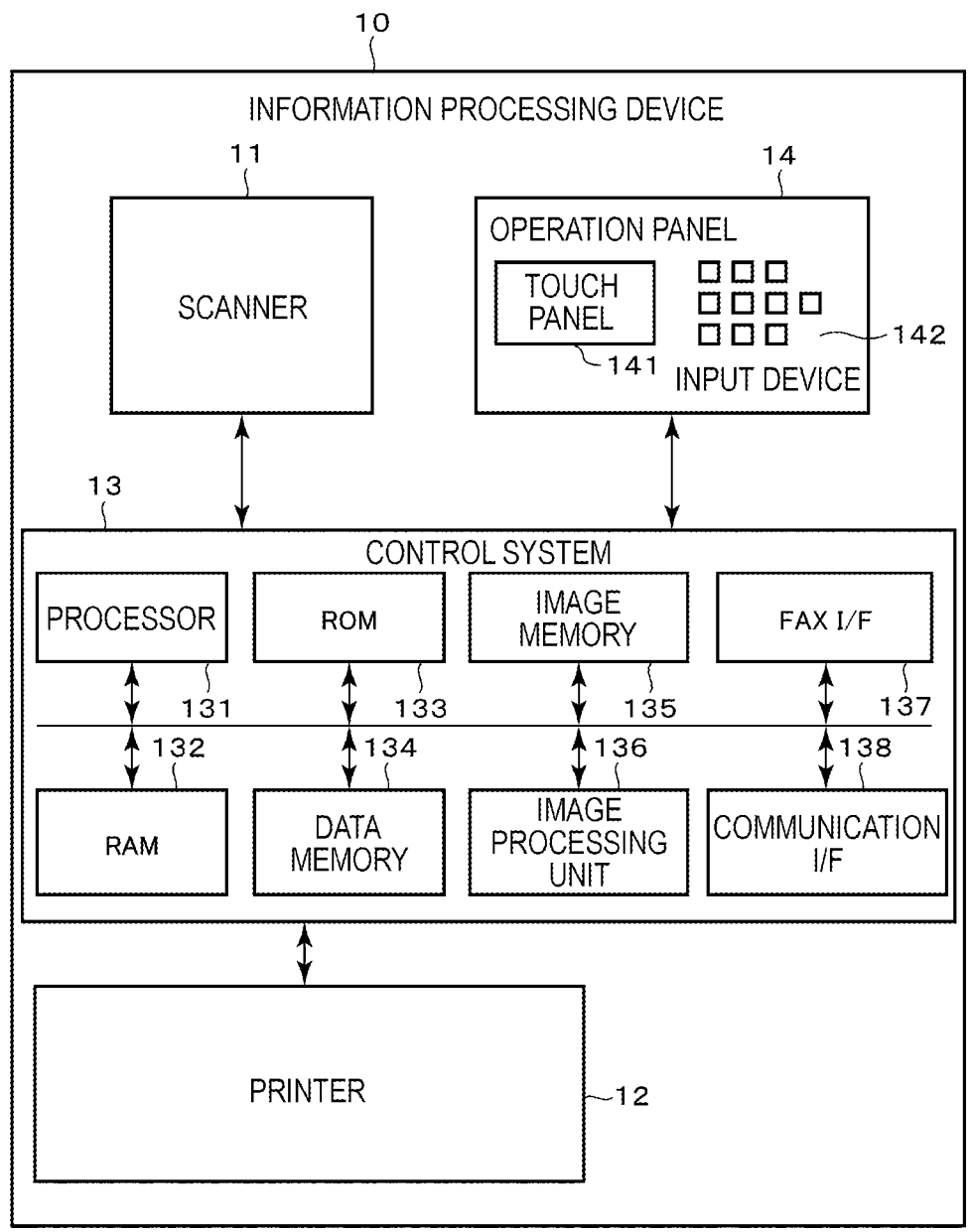
FIG. 2 is a block diagram illustrating a main circuit configuration of an MFP.

FIG. 2 is a block diagram illustrating a main circuit configuration of the MFP 10 according to the embodiment. The MFP 10 includes a scanner 11, a printer 12, a control system 13, and an operation panel 14. The scanner 11, the printer 12, and the operation panel 14 are connected to the control system 13.

The scanner 11 is a device that optically reads an image of a document in response to an operation instruction from the control system 13 and converts the image into image information. The scanner 11 outputs the image information of the read document into the control system 13.

The printer 12 prints an image based on the image information supplied from the control system 13 on paper under various printing conditions designated from the control system 13. The printer 12 may be, for example, an electrophotographic printer, an inkjet printer, or a thermal transfer printer. The control system 13 comprehensively controls the operation of each unit, such as the scanner 11, the printer 12, and the operation panel 14. The control system 13 performs various types of processing such as image processing. The control system 13 includes a processor 131, a random-access memory (RAM) 132, a read-only memory (ROM) 133, a data memory 134, an image memory 135, an image processing unit 136, a facsimile (FAX) I/F 137, and a communication interface (I/F) 138.

The processor 131 performs processing such as calculation and control according to programs. The processor 131 realizes various processing functions by executing a program stored in the ROM 133 or the data memory 134. The RAM 132 is a working memory. The RAM 132 is, for example, a volatile memory. The ROM 133 is a program memory. The ROM 133 is, for example, a non-volatile memory.

The data memory 134 stores control data, a control program, setting information, and the like. The data memory 134 is, for example, a non-volatile memory. The image memory 135 is configured with a hard disk drive, a page memory, and the like. The image memory 135 stores image information. The image processing unit 136 performs an image process with respect to the image information.

The FAX I/F 137 is an interface for performing FAX communication. The communication interface 138 is an interface for performing data communication with an external device via a network such as the dedicated communication network 2.

The operation panel 14 is a user interface. The operation panel 14 includes a touch panel 141 and an input device 142. The touch panel 141 is a stack of a display such as a liquid crystal display or an organic electro-luminescence (EL) display and a sensing device that detects touch input. The input device 142 is, for example, a button, a keyboard, a keypad, or a touchpad.

The MFP 10 stores a device identifier (ID) in the data memory 134. The device ID is a unique code assigned to each MFP 10 to identify the MFP 10.

Figure 3:
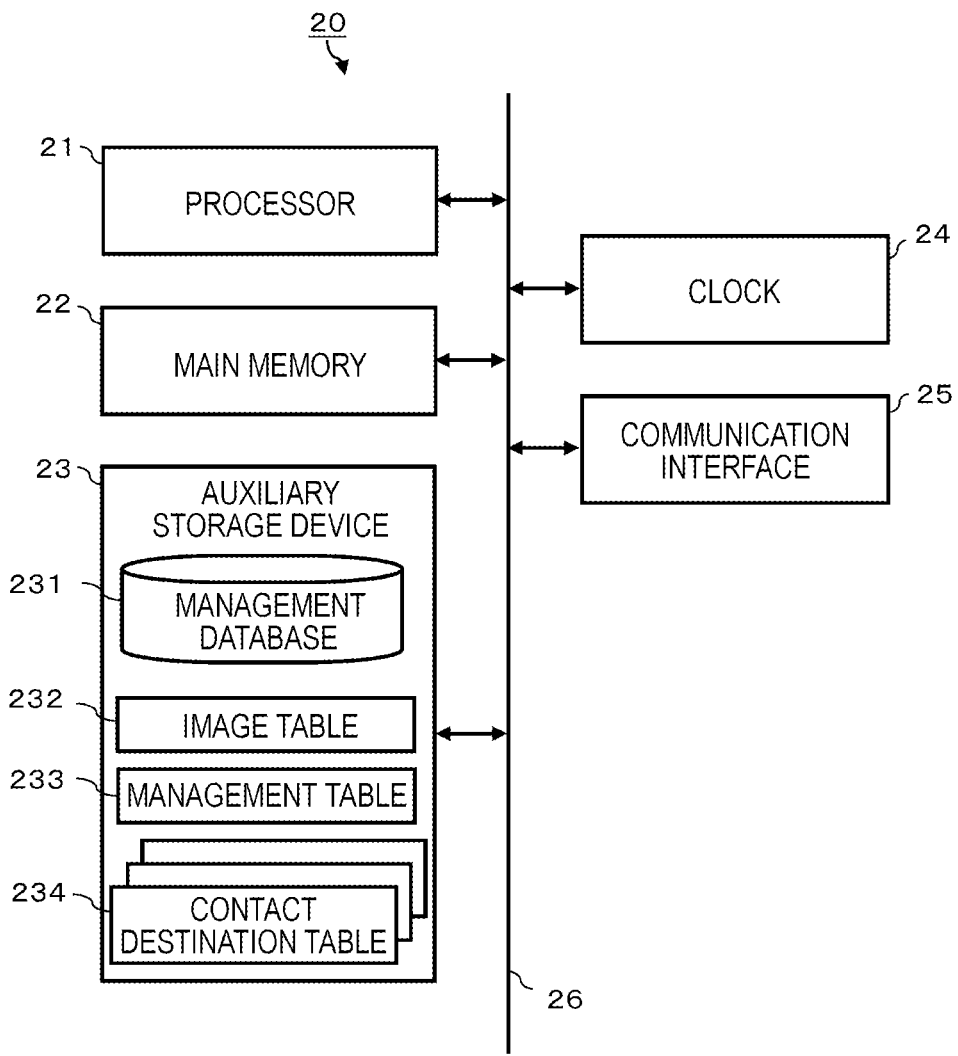
FIG. 3 is a block diagram illustrating a main circuit configuration of a Web server.

FIG. 3 is a block diagram illustrating a main circuit configuration of the Web server 20. The Web server 20 includes a processor 21, a main memory 22 (memory), an auxiliary storage device 23 (memory), a clock 24, a communication interface 25, and a system transmission line 26. The system transmission line 26 includes an address bus, a data bus, a control signal line, and the like. The Web server 20 connects the processor 21, the main memory 22, the auxiliary storage device 23, the clock 24, and the communication interface 25 to the system transmission line 26. In the Web server 20, a computer is configured with the processor 21, the main memory 22, and the auxiliary storage device 23 together with the system transmission line 26 that connects the above.

The processor 21 controls each unit so that various functions as the Web server 20 can be realized according to an operating system or an application program.

The main memory 22 includes a non-volatile memory area and a volatile memory area. The main memory 22 stores an operating system or an application program in a non-volatile memory area. The main memory 22 stores data required by the processor 21 for performing a process for controlling each unit in a volatile memory area. The above data may be stored in the non-volatile memory area. The main memory 22 uses a volatile memory area as a work area where data is appropriately rewritten by the processor 21. The non-volatile memory area is, for example, a ROM. The volatile memory area is, for example, a RAM.

The auxiliary storage device 23 is, for example, an electric erasable programmable read-only memory (EEPROM®), a hard disk drive (HDD), or a solid state drive (SSD). The auxiliary storage device 23 stores data used by the processor 21 to perform various types of processing, data generated by the processing of the processor 21, or the like. The auxiliary storage device 23 may store the above application program. The clock 24 functions as a time information source of the Web server 20. The processor 21 tracks the current date and time based on the time information tracked by the clock 24. The communication interface 25 is an interface circuit for sending and receiving data to and from the MFP 10 connected via the dedicated communication network 2 according to a predetermined communication protocol.

The Web server 20 with the corresponding configuration stores a management database 231, an image table 232 (see FIG. 4), a management table 233 (see FIG. 5), and a contact destination table 234 (see FIG. 6) in the auxiliary storage device 23. The management database 231 stores an MFP data record generated for each MFP 10. The MFP data record includes items such as a device ID, a name, an installed location, a model number, a toner state, and contact information of a maintenance staff or an administrator. The toner state is a state in which amounts of toners of cyan, magenta, yellow, black, and the like are used. The contact information of the maintenance staff or the administrator is the telephone number of the maintenance staff or the administrator to be contacted if the MFP 10 fails. In addition, the storage destinations of the management database 231, the image table 232, the management table 233, and the contact destination table 234 are not limited to the auxiliary storage device 23. The management database 231, the image table 232, the management table 233, and the contact destination table 234 may be stored in the volatile memory area of the main memory 22.

FIG. 4 is a schematic diagram illustrating an example of the image table 232. As illustrated in FIG. 4, the image table 232 is a data table configured with a device ID, image data, and a uniform resource locator (URL). The image data is image data of a Web page screen that displays the information according to the failure circumstance of the MFP 10 corresponding to the device ID. The Web page screen is referred to as a failure circumstance screen. Details of the failure circumstance screen are described below. According to the present embodiment, the image data of the failure circumstance screen is managed by an administrator of the Web server 20 or the like in correlation with the device ID in advance. That is, the administrator or the like updates and stores image data one by one in response to the failure circumstance of the MFP 10. The image data is updated if any change occurs in the information relating to the failure circumstance, such as repairing the MFP 10 by a maintenance staff or changing a scheduled recovery date. The URL is a unique address assigned to the device ID and the image data. The URL specifies the access destination of the information relating to the failure circumstance, that is, the failure circumstance screen. The URL is valid from the time when the URL is generated until the time when the failed MFP 10 is recovered. In addition, the image table 232 is not limited to the items of FIG. 4.

FIG. 5 is a schematic diagram illustrating an example of the management table 233. As illustrated in FIG. 5, the management table 233 is a data table configured with a device ID, a failure date, an updated date, a failure content, a URL, a recovery flag, and the like. The failure date is a date when the MFP 10 fails. The updated date is a date when the image data is updated. The failure content is a cause of the failure, for example, that the scanner 11, the control system 13, or the operation panel 14 fails, or the like. The recovery flag is one-bit data for identifying whether the failed MFP 10 is recovered. According to the present embodiment, the recovery flag is "0" of an initial state until the MFP 10 is recovered, and is set to "1" if the MFP 10 is recovered. In addition, the management table 233 is not limited to the items of FIG. 5.

Figure 6:
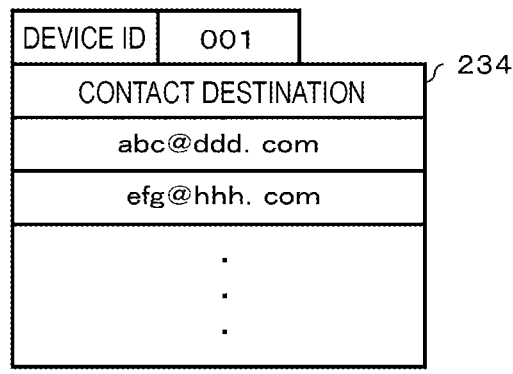
FIG. 6 is a schematic diagram illustrating an example of a contact destination table.
Figure 7:
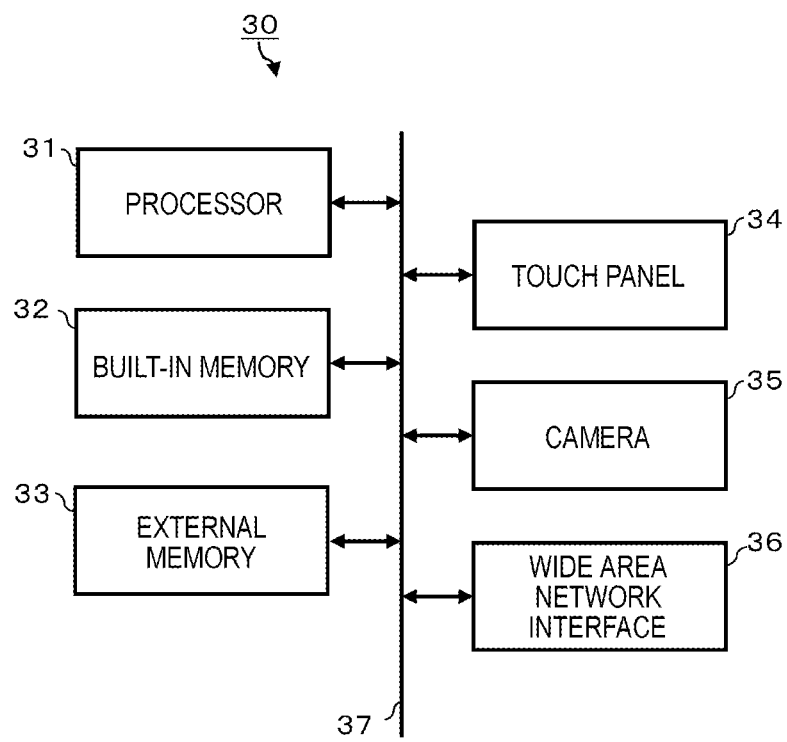
FIG. 7 is a block diagram illustrating a main circuit configuration of a user terminal.

FIG. 6 is a schematic diagram illustrating an example of the contact destination table 234. As illustrated in FIG. 6, the contact destination table 234 is a data table for storing a contact destination of a user who wants notification of the updated information according to the failure circumstance of the MFP 10 corresponding to the device ID for each device ID. The contact destination of the user is, for example, an e-mail address of the user. In addition, the contact destination table 234 is not limited to the items of FIG. 6. FIG. 7 is a block diagram illustrating a main circuit configuration of the user terminal 30. As illustrated in FIG. 7, the user terminal 30 includes a processor 31, a built-in memory 32 (internal memory), an external memory 33, a touch panel 34 (display), a camera 35, a wide area network interface 36, and a system transmission line 37. The system transmission line 37 includes an address bus, a data bus, a control signal line, and the like. The user terminal 30 connects the processor 31, the built-in memory 32, the external memory 33, the touch panel 34, the camera 35, and the wide area network interface 36 to the system transmission line 37. Also, the processor 31, the built-in memory 32, and the external memory 33 are connected to each other via the system transmission line 37 to configure a computer that performs information processing for controlling the user terminal 30.

The processor 31 controls each unit according to an operating system or an application program so that various functions of the user terminal 30 can be realized. The processor 31 is, for example, a central processing unit (CPU).

The built-in memory 32 includes a non-volatile memory area and a volatile memory area. The built-in memory 32 stores an operating system or an application program in the non-volatile memory area. The built-in memory 32 stores data required by the processor 31 for performing a process for controlling each unit in the volatile memory area. The built-in memory 32 uses a volatile memory area as a work area where data is appropriately rewritten by the processor 31. The non-volatile memory area is, for example, a ROM. The volatile memory area is, for example, a RAM.

The external memory 33 is, for example, a Secure Digital (SD) memory card or a universal serial bus (USB) memory. The external memory 33 stores data to be used by the processor 31 for performing various types of processing or data generated by the processing by the processor 31. The external memory 33 may store the application program.

The touch panel 34 is a device that includes an input device and a display device of the user terminal 30. The touch panel 34 detects the touch position with respect to the displayed image and outputs the touch position information to the processor 31.

The camera 35 is an image capturing device built (included) in the user terminal 30. The camera 35 operates as an imaging device of a still image or a moving image, or a scanning device of a data code (DC) such as a barcode or a two-dimensional code by an application program installed in the user terminal 30. The camera 35 is an example of a code reader.

The wide area network interface 36 is a device for performing wireless communication of data with the Web server 20 connected via the wide area network 3 according to a predetermined communication protocol.

Figure 8:
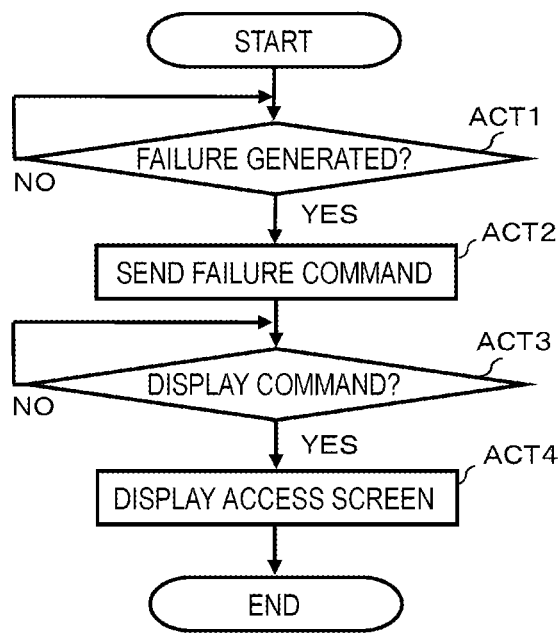
FIG. 8 is a flowchart illustrating a main control procedure of a processor in the MFP.

FIG. 8 is a flowchart illustrating a procedure of main information processing performed by the processor 131 of the MFP 10 according to the control program. FIGS. 9 and 11-13 are flowcharts illustrating procedures of main information processing performed by the processor 21 of the Web server 20 according to the control program. FIG. 10 is a flowchart illustrating a procedure of main information processing performed by the processor 31 of the user terminal 30 according to the control program. Hereinafter, with reference to these drawings, operations of the information processing system 1 are described. In addition, the procedures of the operations and the contents thereof as described below are examples. As long as the same results can be obtained, the procedures and contents thereof are not limited.

The processor 131 of the MFP 10 waits for the occurrence of the failure, as ACT1. If the failure occurs, the processor 131 determines YES in ACT1 and proceeds to ACT2. The processor 131 controls the communication interface 138 so that a failure command (information relating to failure of the MFP 10) is sent to the Web server 20, as ACT2. According to this control, the failure command is sent via the communication interface 138. The device ID, the failure date, and the failure content stored in the data memory 134 are included in the failure command.

Figure 9:
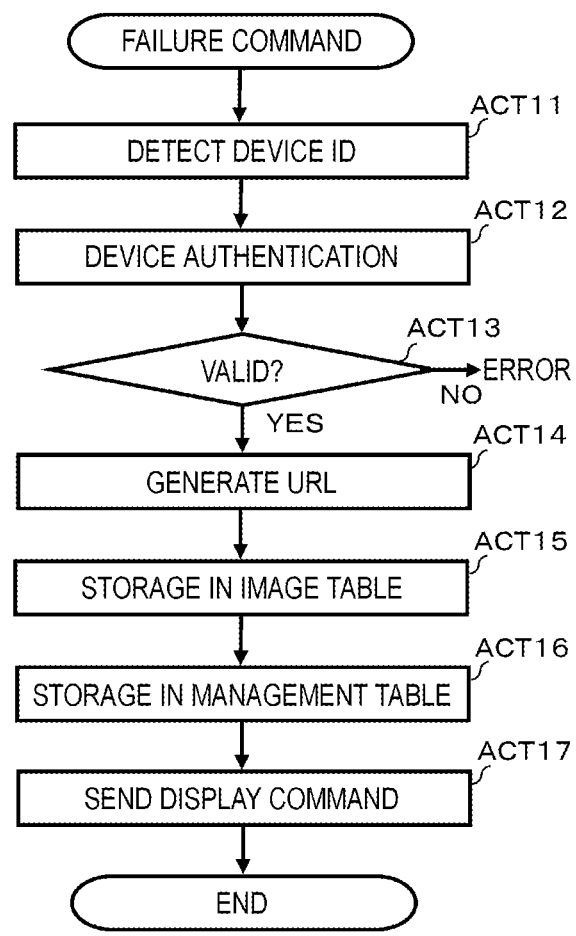
FIG. 9 is a flowchart illustrating a main control procedure of a processor in the Web server.
Figure 10:
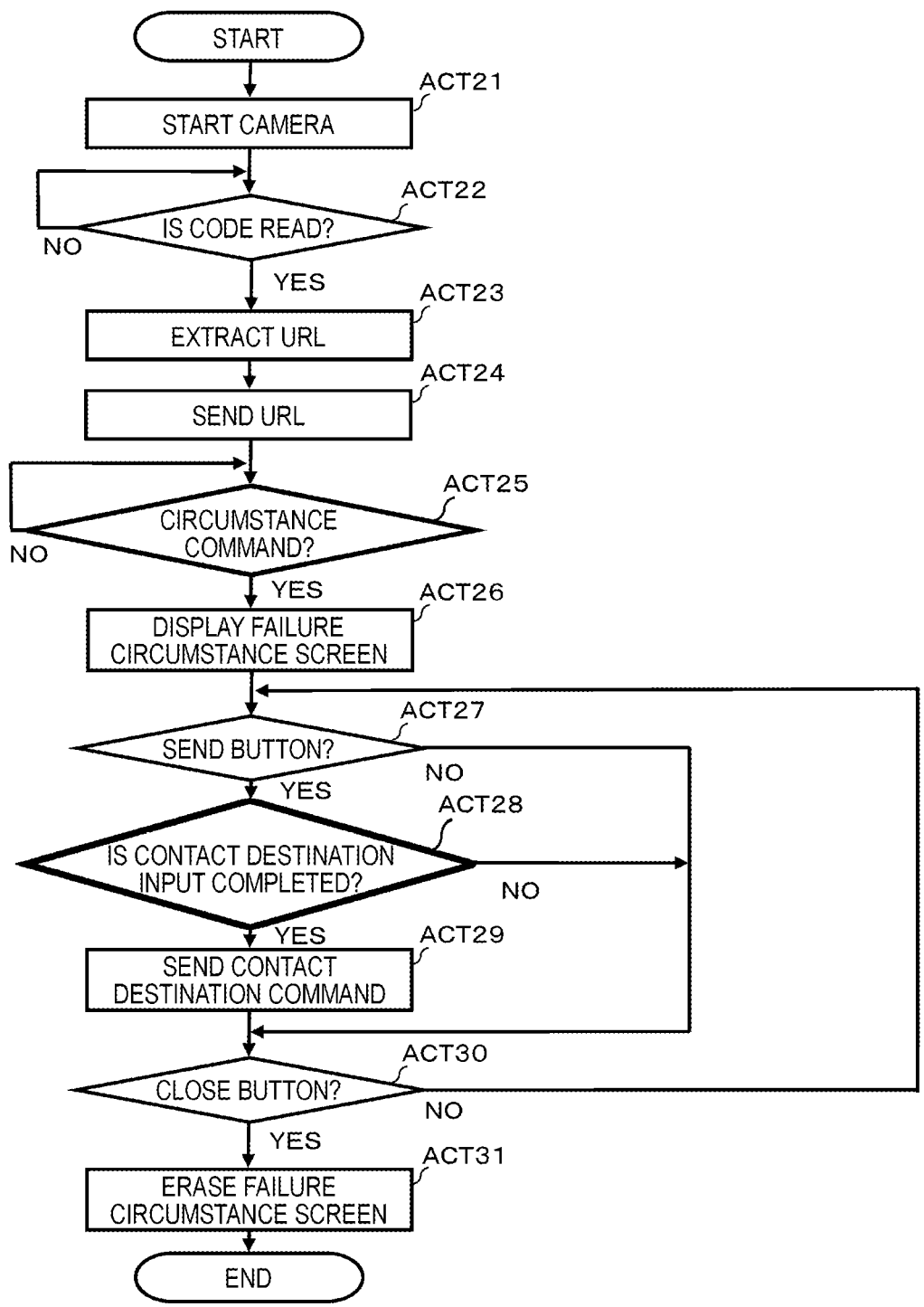
FIG. 10 is a flowchart illustrating a main control procedure of a processor in the information terminal.

The processor 21 of the Web server 20 that received the failure command starts a command reception process of the procedure illustrated in the flowchart of FIG. 9.

The processor 21 detects the device ID from the failure command, as ACT11. Also, the processor 21 authenticates the MFP 10 identified with the device ID, as ACT12. Specifically, the processor 21 checks whether the MFP data record including the device ID is present in the management database 231. If the corresponding MFP data record is present in the management database 231, the processor 21 determines that the MFP authentication is valid. In contrast, if the corresponding MFP data record is not present in the management database 231, the processor 21 determines that the MFP authentication is invalid.

The processor 21 checks the result of the MFP authentication, as ACT13. If the MFP authentication result is invalid, the processor 21 determines NO in ACT13 and sets the MFP authentication as an error. In case of the error, the processor 21 controls the communication interface 25 so that an error command is sent to the MFP 10 as the failure command sending source. According to this control, the error command is sent via the communication interface 25. The processor 131 of the MFP 10 that receives the error command causes the touch panel 141 to display an error screen.

If the MFP authentication result is valid, the processor 21 determines YES in ACT13 and proceeds to ACT14. As ACT14, the processor 21 generates a URL that specifies the image data of the failure circumstance screen that is the access destination of the information according to the failure circumstance, which was correlated with the device ID included in the failure command in advance.

As ACT15, the processor 21 stores a URL corresponding to the device ID and the image data described above in the image table 232. As ACT16, the processor 21 stores the device ID, the failure date, and the failure content included in the failure command in the management table 233 and the URL generated in the process of ACT14.

Figures 14, 15:
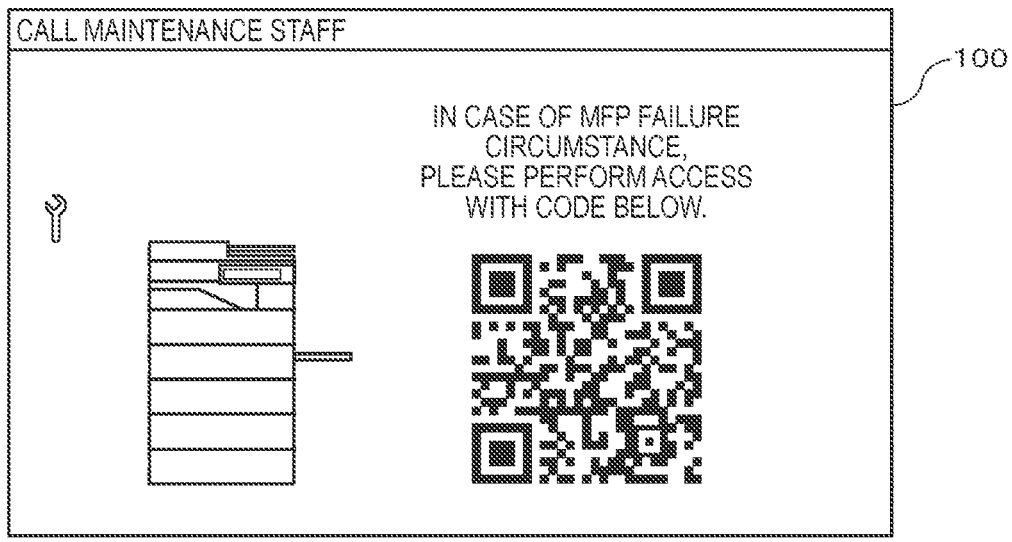
FIG. 14 is a schematic diagram illustrating an example of an access screen.
FIG. 15 is a schematic diagram illustrating an example of a failure status screen.

As ACT17, the processor 21 controls the communication interface 25 so that the display command is sent to the MFP 10 of the failure command sending source. According to this control, the display command is sent via the communication interface 25. Screen data of an access screen 100 (see FIG. 14) is included in the display command. With the above, the processor 21 ends the failure command reception process. FIG. 14 is a schematic diagram illustrating an example of the access screen 100. As illustrated in FIG. 14, the access screen 100 is configured with a data code which is a symbol and text data that notifies that the failure circumstance can be checked if the data code is read. The data code is, for example, a two-dimensional barcode. The data code includes the URL generated in the process of ACT14 of FIG. 9. In addition, the contents of the text data and the image displayed on FIG. 14 are examples.

The description refers back to FIG. 8.

The processor 131 of the MFP 10 that controls the sending of the failure command in ACT2 waits for a display command from the Web server 20, as ACT3. If a display command is received from the Web server 20, the processor 131 determines YES in ACT3 and proceeds to ACT4. The processor 131 causes the touch panel 141 to display the access screen 100, as ACT4. With the above, the processor 131 ends the information processing of the procedure illustrated in the flowchart of FIG. 8.

The user who uses the MFP 10 checks the access screen 100 displayed on the touch panel 141 and starts a dedicated application of the user terminal 30. Then, the processor 31 starts the information processing of the procedure illustrated in the flowchart of FIG. 10.

The processor 31 starts the camera 35, as ACT21. If the camera 35 starts, the processor 31 causes the touch panel 34 to display the camera screen. In addition, an image indicating a reading area of a data code of the two-dimensional code system is displayed on the camera screen. The user who checks the camera screen holds a lens of the camera 35 over the data code so that the data code fits in the image.

The processor 31 waits for the data code read by the camera 35, as ACT22. If the data code fits in the image, the processor 31 determines that the data code is read. The processor 31 determines YES in ACT22 and proceeds to ACT23. The processor 31 extracts the URL included in the data code as ACT23. The processor 31 controls the wide area network interface 36 and sends the URL to the Web server 20, as ACT24. The processor 21 of the Web server 20 that received the URL starts the URL reception process of the procedure illustrated in the flowchart of FIG. 11.

As ACT41, the processor 21 refers to the image table 232 and extracts image data corresponding to the received URL. As ACT42, the processor 21 controls the communication interface 25 so that the circumstance command is sent to the user terminal 30 of the URL sending source. According to this control, the circumstance command is sent via the communication interface 25. The circumstance command is received by the user terminal 30 via the wide area network 3. The device ID and the screen data of a failure circumstance screen 200 (see FIG. 15) are included in the circumstance command. With the above, the processor 21 ends the URL reception process.

FIG. 15 is a schematic diagram illustrating an example of the failure circumstance screen 200. As illustrated in FIG. 15, the device information (such as the name, the installed location, the model number, the toner state, and the contact information of a maintenance staff or an administrator), the failure content, and a message notifying the progress status of the failure circumstance, the scheduled recovery date, or the like, are displayed on the failure circumstance screen 200. A contact destination input field 201 is displayed on the failure circumstance screen 200, together with the text data promoting a user who wants the notification of the updated information relating to the failure circumstance of the MFP 10 to input a contact destination. The contact destination of the user is, for example, an e-mail address. An image of a send button 202 and an image of a close button 203 are displayed on the failure circumstance screen 200. If the user wants the notification of the update, the user touches the send button 202 after inputting the contact destination to the contact destination input field 201. If the user does not want the notification of the update, the user touches the close button 203. Even if a plurality of different users access the failure circumstance screen 200, the same screen is uniformly provided. Here, the contact destination of the user which was input previously is not displayed. The contents of the text data and the image displayed in FIG. 15 are examples.

The description refers back to FIG. 10.

The processor 31 of the user terminal 30 that controls the URL sending in ACT24 waits for the circumstance command from the Web server 20 as ACT25. If the circumstance command is received from the Web server 20, the processor 31 determines YES in ACT25 and proceeds to ACT26. The processor 31 causes the touch panel 34 to display the failure circumstance screen 200, as ACT26.

If the user who checked the failure circumstance screen 200 wants the notification of the updated information relating to the failure circumstance of the MFP 10, the user inputs an e-mail address to the contact destination input field 201 and touches the send button 202.

The processor 31 checks whether the send button 202 was touched, as ACT27. If the send button 202 was not touched, the processor 31 determines NO in ACT27 and proceeds to ACT30. If the send button 202 is touched, the processor 31 determines YES in ACT27 and proceeds to ACT28. The processor 31 checks whether the e-mail address is input to the contact destination input field 201, as ACT28.

If the e-mail address is not input to the contact destination input field 201, the processor 31 determines NO in ACT28 and proceeds to ACT30. If the e-mail address is input to the contact destination input field 201, the processor 31 determines YES in ACT28 and proceeds to ACT29.

The processor 31 controls the wide area network interface 36 so that the contact destination command is sent to the Web server 20, as ACT29. According to this control, the contact destination command is sent from the wide area network interface 36. The contact destination command is received by the Web server 20 via the wide area network 3. The device ID included in the circumstance command and the screen data of the failure circumstance screen 200 to which the e-mail address is input are included in the contact destination command.

The processor 31 checks whether the close button 203 was touched as ACT30. If the close button 203 was not touched, the processor 31 determines NO in ACT30 and returns to ACT27. That is, the user can input the e-mail address again. According to the present embodiment, whenever the user inputs the e-mail address to the contact destination input field 201 and touches the send button 202, the processor 31 sends the contact destination command. If the close button 203 is touched, the processor 31 determines YES in ACT30 and proceeds to ACT31.

The processor 31 closes the failure circumstance screen 200 that is displayed on the touch panel 34, as ACT31. With the above, the processor 31 ends the information processing of the procedure illustrated in the flowchart of FIG. 10.

Figure 12:
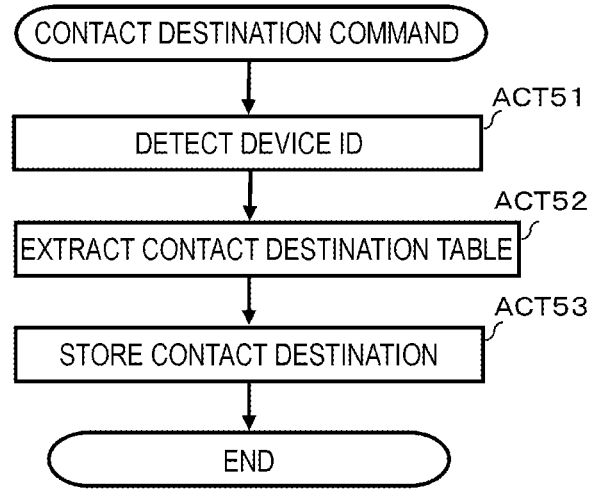
FIG. 12 is a flowchart illustrating the main control procedure of the processor in the Web server.

The processor 21 of the Web server 20 that receives the contact destination command starts the contact destination command reception process of the procedure illustrated in the flowchart of FIG. 12.

The processor 21 detects the device ID from the contact destination command, as ACT51. The processor 21 extracts the contact destination table 234 corresponding to the device ID, as ACT52.

As ACT53, the processor 21 stores an e-mail address in the contact destination table 234 based on the screen data of the failure circumstance screen 200 included in the contact destination command. In addition, if the contact destination command is received from the same user a plurality of times, the processor 21 rewrites the newest e-mail address and stores the newest e-mail address in the contact destination table 234. With the above, the processor 21 ends the reception process of the contact destination command.

Figure 13:
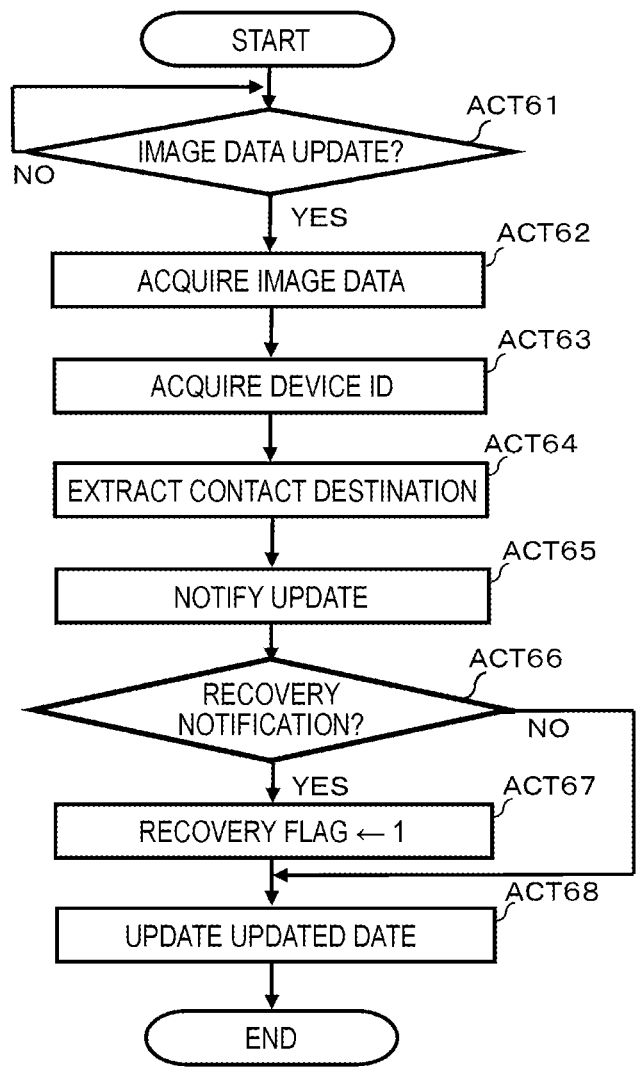
FIG. 13 is a flowchart illustrating the main control procedure of the processor in the Web server.

As ACT61 of FIG. 13, the Web server 20 waits for the update of the image data according to the failure circumstance by the administrator. If the image data is updated, the processor 21 determines YES in ACT61 and proceeds to ACT62. The processor 21 acquires the updated image data, as ACT62. As ACT63, the processor 21 refers to the image table 232 and acquires the device ID corresponding to the updated image data. The processor 21 extracts all registered contact destinations with reference to the contact destination table 234 corresponding to the device ID, as ACT64.

As ACT65, the processor 21 notifies that the information relating to the failure circumstance of the MFP 10 with respect to the contact destinations extracted in the process of ACT64 was updated. The notification content is, for example, "the recovery was completed," "the scheduled recovery date is changed to July 22," or the like. As ACT66, the processor 21 checks whether the notification content is a recovery notification. The recovery notification notifies that the failed MFP 10 was recovered. The above message "the recovery was completed" is an example. If the notification content is not a recovery notification of the MFP 10, the processor 21 determines NO in ACT66 and proceeds to ACT68. The process of ACT68 is described below. In case of the recovery notification, the processor 21 determines YES in ACT66 and proceeds to ACT67. The processor 21 refers to the management table 233 and updates the recovery flag on the same row as the device ID to "1," as ACT67. If the recovery flag is set to "1," all items on the same row as the recovery flag are invalidated. That is, according to the recovery of the MFP 10, the user cannot access the failure circumstance screen 200 that is correlated with the failure of the MFP 10. The contact destination table 234 corresponding to the invalidated device ID is also invalidated. That is, the notification to the user who wants the notification of the updated information relating to the failure circumstance of the MFP 10 is not performed. The processor 21 updates the updated date of the management table 233, as ACT68. With the above, the processor 21 ends the information processing of the procedure illustrated in the flowchart of FIG. 13.

As clearly understood from the above, the Web server 20 is an example of the server device which configures the communication unit by performing the processes of ACT1 to ACT4 of FIG. 8. That is, the Web server 20 communicates with an information processing device that includes a display unit (display) displaying a symbol and a sending unit (transmitter) sending information relating to the failure of the information processing device, that is, the MFP 10.

The processor 21 of the Web server 20 configures the information storage unit by performing the process of ACT16 of FIG. 9. That is, the Web server 20 stores the information relating to the failure sent from the MFP 10.

Figure 11:
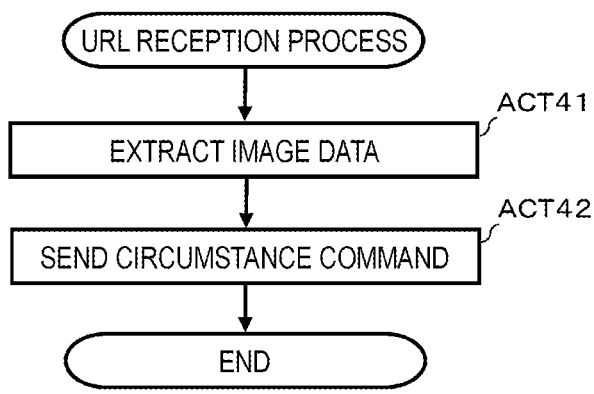
FIG. 11 is a flowchart illustrating the main control procedure of the processor in the Web server.

The processor 21 of the Web server 20 configures an output unit (transmitter) by performing the processes of ACT41 and ACT42 of FIG. 11. That is, the Web server 20 outputs the information relating to the failure stored in the access destination specified by the symbol to the user terminal 30 that read the symbol.

In this manner, according to the present embodiment, the failure circumstance screen 200 is displayed on the touch panel 34 by reading the data code of the access screen 100 displayed on the touch panel 141 of the MFP 10 with the user terminal 30. Therefore, the user can easily grasp the failure circumstance of the MFP 10 without a complicated operation. In addition, the contact destination input field 201 is displayed on the failure circumstance screen 200. Accordingly, the user can select whether to request the notification of the updated information relating to the failure circumstance of the MFP 10.

In addition, the processor 21 of the Web server 20 configures the contact destination storage unit by performing the process of ACT53 of FIG. 12. That is, the Web server 20 stores the contact destination. The processor 21 of the Web server 20 configures the sending unit by performing the processes of ACT61 to ACT65 of FIG. 13. That is, if the information relating to the failure of the MFP 10 is updated, the Web server 20 sends the information relating to the failure updated to the contact destination stored in the contact destination storage unit.

According to the present embodiment, if the information relating to the failure circumstance of the MFP 10 is updated, the user who inputs the contact destination to the contact destination input field 201 of the failure circumstance screen 200 and touches the send button 202 is notified of the update. Accordingly, the user does not need to read the data code of the access screen 100 one by one in order to access the failure circumstance screen 200, and thus the effort of the user is reduced. Further, since the notification is performed only to the user who wants notification of the updated information relating to the failure circumstance of the MFP 10, it is possible to prevent the user who does not want the notification from feeling annoyed due to the notification.

With the above, the embodiment of the server device and the control program thereof is described, but the embodiment is not limited thereto.

In the above embodiment, a case where the information processing device is the MFP 10 is exemplified. The information processing device is not limited to the MFP 10. For example, the information processing device may be a copying machine or a printer.

In the above embodiment, a case where a two-dimensional barcode which is a symbol is displayed on the access screen 100 is exemplified. The symbol is not limited to the two-dimensional barcode. For example, the symbol may be an image of a figure including a URL.

According to the embodiment, a case where the Web server 20 generates a URL is exemplified. For example, the MFP 10 may generate a URL and send the URL to the Web server 20 together with the device ID, the failure date, and the failure content stored in the data memory 134. In addition, according to the embodiment, a case where the URL is generated for each time of the failure is exemplified. For example, the URL may be set for each MFP 10.

According to the embodiment, a case where the management database 231 is stored in the auxiliary storage device 23 of the Web server 20 is exemplified. For example, the management database 231 may be stored in the MFP 10.

In the above embodiment, a case where the update of the information relating to the failure circumstance of the MFP 10 is notified to the contact destination of the user is exemplified. For example, an embodiment may be configured so that the URL is sent to the user terminal 30 and the user can access the failure circumstance screen 200 if the user touches the corresponding URL.

In the above embodiment, a case where the user cannot access the failure circumstance screen 200 of the MFP 10 corresponding to the recovery flag if the recovery flag is set to "1" is exemplified. For example, a message such as "the recovery was completed" may be displayed on the failure circumstance screen 200 if the recovery flag is set to "1." In the above embodiment, a case where the processor 21 of the Web server 20 rewrites the newest e-mail address and stores the newest e-mail address in the contact destination table 234 if the contact destination command is received from the same user a plurality of times is exemplified. For example, whenever the contact destination command is received from the same user a plurality of times, an e-mail address may be stored in the contact destination table 234. That is, the user can register a plurality of e-mail addresses.

While certain embodiments have been described, these embodiments have been presented by way of example only, and are not intended to limit the scope of the present disclosure. Indeed, the novel embodiment described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A system comprising:
a user device comprising a network interface, a reader, and a first display; and
a server comprising:
a communication interface configured to communicate with the network interface of the user device and an information processing device that includes a second display; and
a first controller configured to:
receive, and store in a memory, a failure command relating to a failure of the information processing device;
generate a first screen command based on the failure command, the first screen command instructing the information processing device to generate a first screen including a symbol that is readable by the reader and text data indicating that the failure has occurred;
send the first screen command to the information processing device;
generate a second screen command based on the failure command, the second screen command instructing the user device to display a second screen on the first display, the second screen including failure content; and
send the second screen to the user device.

2. The system of claim 1, wherein:
the communication interface is further configured to receive an update from the information processing device; and
the second screen further includes a field configured to receive a contact destination at which a user desires to receive a notification of the update.

3. The system of claim 2, wherein:
the memory is configured to store the contact destination; and
the first controller is further configured to send the update to the contact destination.

4. The system of claim 3, wherein the contact destination is an e-mail address.

5. The system of claim 1, wherein the symbol is a two-dimensional code.

6. The system of claim 1, wherein:
the user device further comprises a second controller configured to access a uniform resource locator in response to reading the symbol; and
the second screen displayed by the first display is provided by the uniform resource locator.

7. The system of claim 6, wherein the first controller is configured to embed the uniform resource locator in the symbol.

8. The system of claim 7, wherein the second controller is configured to access the uniform resource locator in response to identifying the uniform resource locator from the symbol.

9. The system of claim 1, wherein the second screen further includes a device information and a message identifying a current status of the failure.

10. The system of claim 9, wherein the device information includes at least one of (a) a name of the information processing device, (b) a location of the information processing device, (c) a model number of the information processing device, (d) a toner state of the information processing device, or (e) contact information at least one of maintenance staff or an administrator.

11. The system of claim 1, wherein the failure content provides information relating to a cause of the failure.

12. A user device comprising:
a camera configured to capture an image of a symbol displayed on a first display of an information processing device, the symbol containing information related to a failure of the information processing device;
a second display; and
a controller configured to:
control the camera to capture the image of the symbol;
extract the information from the captured image of the symbol; and
control the second display to display a screen based on the extracted information, the screen including failure content related to the failure of the information processing device.

13. The user device of claim 12, further comprising a network interface configured to communicate wirelessly with a server that generates the symbol.

14. The user device of claim 12, wherein the user device is a smartphone, the smartphone controlling the second display according to an application program installed on the smartphone.

15. The user device of claim 12, wherein the symbol is a two-dimensional code, and the information related to the failure of the information processing device is a universal resource locator embedded in the two-dimensional code.

16. A method of responding to a failure of an information processing device, the method comprising:
capturing, by a camera of a user device, an image of a symbol displayed by a first display of the information processing device;
extracting, by the user device from the image of the symbol, information related to the failure of the information processing device; and
displaying, on a second display of the user device, a screen based on the extracted information, the screen including failure content related to the failure of the information processing device.

17. The method of claim 16, further comprising:
receiving, by a server, a failure command relating to the failure of the information processing device; and
generating, by the server, a first screen command based on the failure command, the first screen command instructing the information processing device to display the symbol and text data indicating that the failure has occurred.

18. The method of claim 17, further comprising communicating wirelessly between the user device and the server.

19. The method of claim 16, wherein the user device is a smartphone, and the smartphone controls the second display according to an application program installed on the smartphone.

20. The method of claim 16, wherein the symbol is a two-dimensional code, and the information related to the failure of the information processing device is a universal resource locator embedded in the two-dimensional code.

\* \* \* \* \*